(12) United States Patent
Panza et al.

(10) Patent No.: US 9,678,228 B2
(45) Date of Patent: Jun. 13, 2017

(54) METHOD OF REAL-TIME MAPPING OF A DISTRIBUTION OF PHOTONS IN A SITE

(71) Applicant: INSTITUT DE RADIOPROTECTION ET DE SURETE NUCLAIRE, Fontenay-aux-Roses (FR)

(72) Inventors: Fabien Panza, Paris (FR); Rodolfo Gurrarian, Palaiseau (FR)

(73) Assignee: INSTITUT DE RADIOPROTECTION ET DE SURETE NUCLAIRE, Fontenay-aux-Roses (FR)

( * ) Notice: Subject to any disclaimer, the term of this patent is extended or adjusted under 35 U.S.C. 154(b) by 79 days.

(21) Appl. No.: 14/407,064

(22) PCT Filed: Jun. 11, 2013

(86) PCT No.: PCT/EP2013/062065
§ 371 (c)(1),
(2) Date: Dec. 10, 2014

(87) PCT Pub. No.: WO2013/186231
PCT Pub. Date: Dec. 19, 2013

(65) Prior Publication Data
US 2015/0108359 A1    Apr. 23, 2015

(30) Foreign Application Priority Data

Jun. 12, 2012   (FR) ...................... 12 55484

(51) Int. Cl.
*G01T 1/36*      (2006.01)
*G01T 1/169*     (2006.01)
*G01T 7/00*      (2006.01)

(52) U.S. Cl.
CPC .............. *G01T 1/366* (2013.01); *G01T 1/169* (2013.01); *G01T 7/00* (2013.01)

(58) Field of Classification Search
None
See application file for complete search history.

(56) References Cited

U.S. PATENT DOCUMENTS

| 5,936,240 A | 8/1999 | Dudar et al. |
| 2004/0037394 A1 | 2/2004 | Kuroda et al. |
| 2011/0246137 A1 | 10/2011 | Vilim et al. |

FOREIGN PATENT DOCUMENTS

| JP | 2001-208848 | 8/2001 |
| JP | 2003-337176 | 11/2003 |

(Continued)

OTHER PUBLICATIONS

Search Report and Written Opinion from FR 1255484 dated Mar. 4, 2013 (7 pages).

(Continued)

*Primary Examiner* — David Porta
*Assistant Examiner* — Gisselle Gutierrez
(74) *Attorney, Agent, or Firm* — Blakely Sokoloff Taylor & Zafman LLP

(57) ABSTRACT

A method of real-time mapping of a presence distribution of a source of photons in a site. The method includes measuring, at a plurality of measurement points, a photon flux in an energy bandwidth determined with a spectrometric detector, and noting the geographical co-ordinates of the point. At each measurement point, from a response function of the detector, and information on the site, establishing a distribution of origins of the photons around the measurement point. From the distributions, representing, on a map of the site, a distribution of origin of photons, the method further includes, for each measurement point starting from the second, a step prior to the representing step, during which (Continued)

the distributions of origins of the photons around the current measurement point are correlated with those of previous measurement points.

8 Claims, 8 Drawing Sheets

(56) References Cited

FOREIGN PATENT DOCUMENTS

| | | |
|---|---|---|
| JP | 2008-151539 | 7/2008 |
| WO | WO 2005/022197 A2 | 3/2005 |

OTHER PUBLICATIONS

Search Report and Written Opinion from PCT/EP2013/062065 dated Oct. 9, 2013 (10 pages).
English Language Translation of Japanese Office Action dated Jan. 29, 2016, Japanese Application No. 2015-516596.

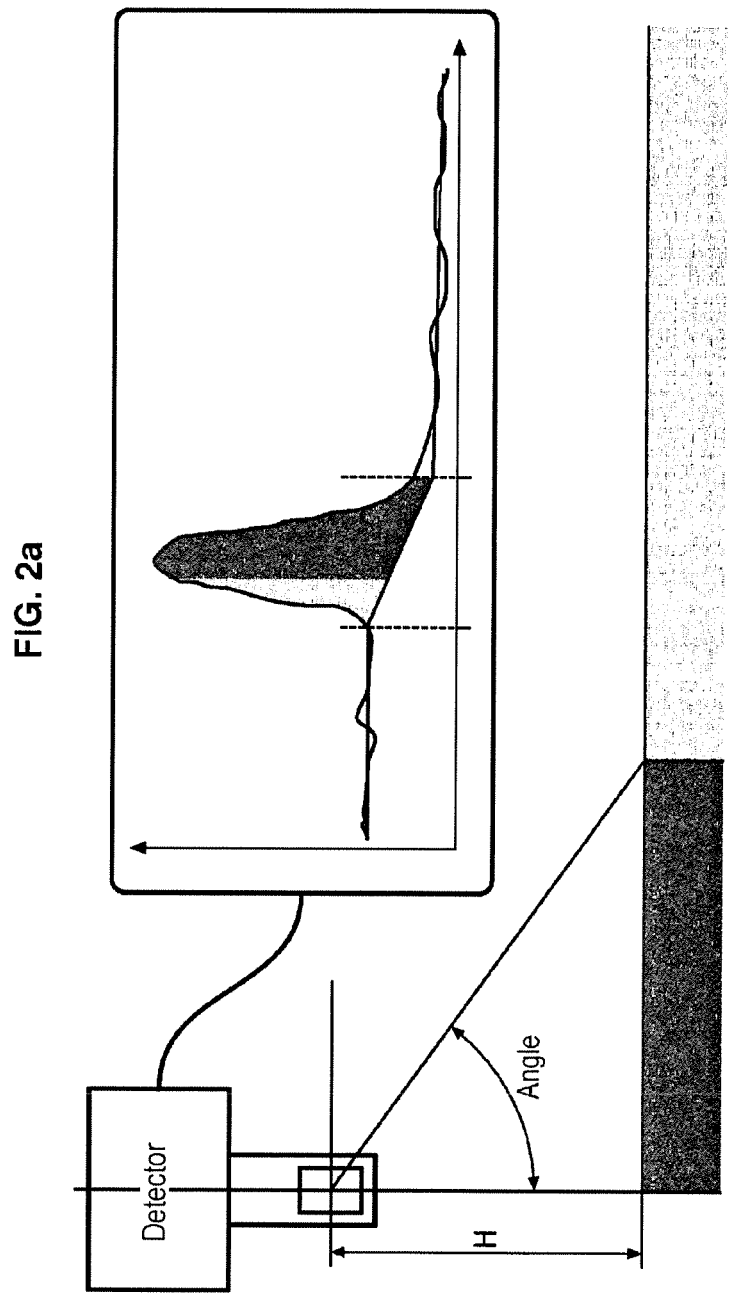

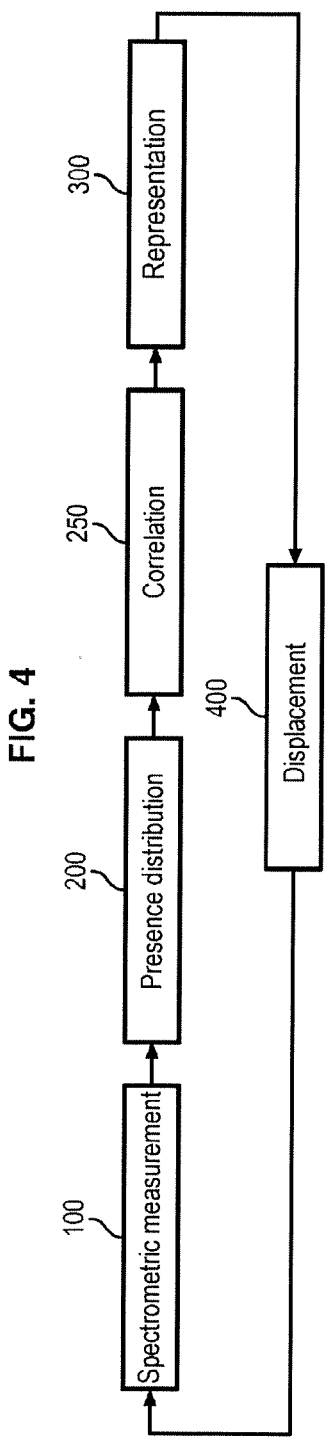

METHOD OF REAL-TIME MAPPING OF A DISTRIBUTION OF PHOTONS IN A SITE

FIELD OF THE INVENTION

The invention relates to the field of acquisition and processing of spectrometric data, for the realisation of cartography of the probability of the presence of a source of photons in a site in real time, that is, during acquisition of spectrometric data, and for sources of any kind (mineral, pollution, sealed sources).

The invention applies especially to radioactive radiations (gamma rays), but also to radiations of infrared type or X-rays to help the operator orient the taking of radioactive measurements in areas of greater interest.

PRIOR ART

The use is already known of detectors of ionising radiations, such as detectors of electromagnetic radiations (gamma or X photons) to locate a source of radiation present at the surface or depth of an open space.

It is especially known to criss-cross an open space with such a mobile detector, mounted on a carriage or on an airborne engine. The detector acquires, in a plurality of uniformly distributed measuring points, a spectrum of gamma radiation emitted by a source of photon emission present in the ground, comprising both a rate of photon counting and the energy of said photons.

In the case of a radioactive source these data are representative respectively of the number of deexcitations of an atomic core, and of the atomic species of said core.

However, this method involves taking systematic measurements over the entire site, which requires taking as many measurements at the level of the areas where the source is located as at the level where there is no source.

Consequently, taking a measurement will be long, and the efficacy of this taking of measurements is not optimal. Indeed, some of the measurements are not pertinent for studying the source (especially measurements taken in areas where there is no source), and the number of measurements above the source cannot be enough to reflect the activity of this source with sufficient precision.

To rectify this problem some radioactivity cartography tools use geostatistic methods (such as Kriging), for which processing of data is executed after a shorter series of measurements to locate the areas of greatest interest is finished.

Other measurements are then made in the areas of greatest interest to refine the characterisation of the site being studied.

These statistical methods however fail to produce data on the source of emission of photons in real time.

On the other hand, existing methods are imprecise, since the photons detected do not all originate from the area of the ground situated perpendicularly to the detector. In fact, some gamma rays are emitted at the surface in other directions to the normal to the latter.

Consequently, some photons detected at a measuring point can originate from an adjacent area of said point, which falsifies information deduced from the measurement at this point.

To rectify this problem, some detection systems, comprising a mobile carriage and a detector mounted on said carriage, also comprise a shielded cage in which the detector is placed. This cage collimates the detector and therefore prevents detection of photons not originating from the area situated perpendicularly to the measuring point where the detector is located.

However, use of this cage involves considering only a limited number of the photons originating from the source. The result is a significant loss of information on the total number of photons considered for analysis of the source.

PRESENTATION OF THE INVENTION

The aim of the invention is to eliminate the problem mentioned above by indicating in real time on a cartographic representation the area where a source of emission of photons has a greater chance of being found.

More particularly, an aim of the invention is to make taking measurements more efficacious by orienting the operator during this time to determine more precisely and more rapidly the placement of said source.

In this respect, the aim of the invention is a cartography method in real time of distribution of the presence of a source of photons at a site, the method comprising steps consisting of measuring, at a plurality of measuring points, a flow of photons in a determined energy band with a non-collimated spectrometric detector and logging the geographic coordinates of said point, and at each measuring point, from a response function of the spectrometric detector, and information on the nature of the site, set up distribution of provenances of photons detected around the measuring point, from distributions of provenance around the measuring points represent distribution of provenance of photons on a map of the site the method also comprising, for each measuring point from the second, a step prior to the representation step during which the distributions of provenances of photons around the current measuring point are correlated with those of previous measuring points.

Advantageously, but optionally, the invention can also comprise at least one of the following characteristics:

the determined energy band is centred on an energy line characteristic of an atomic species of the source of photons.

the response function of the detector is set as a function of its geometry and its detection efficacy.

the representation step comprises modelling of a surface centred on the current measuring point, and the projection of said surface on a map of the site.

the modelling of a surface is done by generation of a matrix whereof the elements represent pixels of the site of a determined size.

the modelling step comprises the association, at each pixel of a matrix associated with a measuring point, of a percentage of the flow of photons measured at the measuring point as a function of the distance between the pixel and the measuring point.

the percentage of the flow of photons associated with a pixel is determined from percentages of the flow of photons measured associated with crowns centred on the measuring point and having an intersection with the pixel.

the correlation step comprises calculation, for each pixel of the site illustrated in several matrices modelled from several measuring points, of an average of the values of distributions of provenances of photons associated with said pixel as a function of the number of time when the pixel is illustrated in a matrix.

the average of values of distributions of provenances of photons in a pixel is weighted as a function of said values.

The invention also relates to a system for detection of radioactive radiation for executing the method according to the invention, the system comprising:

a mobile carriage, adapted to be shifted to a site,
a non-collimated radiation detector, mounted on said carriage, adapted to measure spectrometric data in a plurality of measuring points,
a computing and processing unit,
a positioning device, and
a memory in communication with the computing and processing unit,
the system being characterized in that:
the radiation detector is adapted to transmit the spectrometric data to the computing and processing unit, and
said unit is adapted to model, from the data and as a function of the spectrometric data measured, distribution of provenances of photons around a measuring point, correlate the distributions of provenances of photons for several measuring points, and
represent distribution of photon emission on a map of the site.

DESCRIPTION OF DRAWINGS

Other characteristics, aims and advantages of the invention will emerge from the following description which is purely illustrative and non-limiting, and which must be viewed in conjunction with the appended drawings, in which:

FIG. 4 illustrates the principal steps of an embodiment of the method according to the invention.

DETAILED DESCRIPTION OF AT LEAST ONE EMBODIMENT

Detection System

Figure 1A:
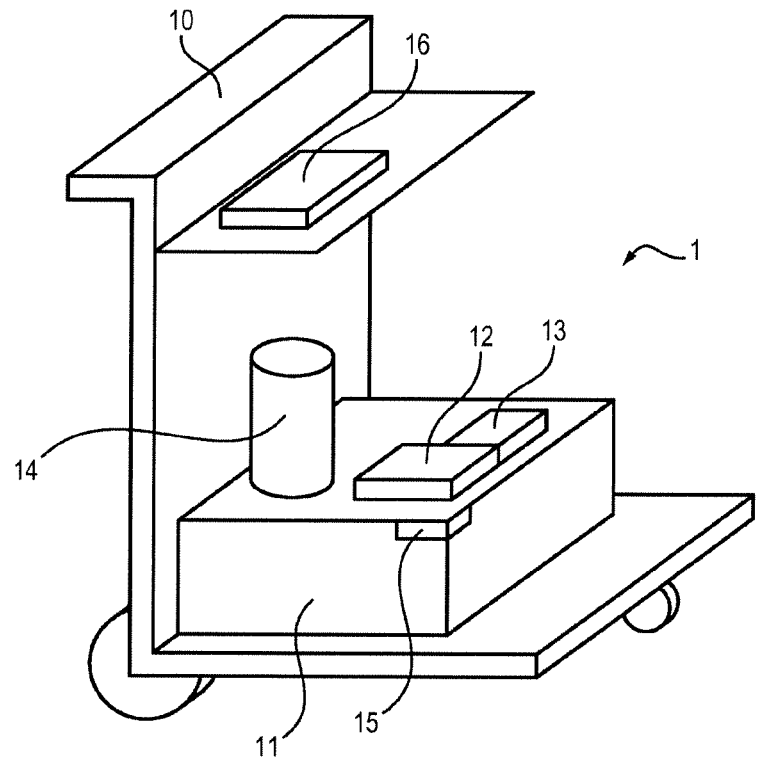
FIG. 1a schematically illustrates a detection system for executing the method according to the invention, FIG. 1b schematically illustrates a radiation detector used in such a system, FIG. 2a schematically illustrates the distribution of photons detected as a function of their provenance relative to the detector.

In reference to FIG. 1a, a mobile detection system 1 is used, comprising a mobile carriage 10, on which is mounted a radiation detector 11. This detector 11 is preferably a detector of gamma rays of germanium semi-conductor spectrometer type, having a detection crystal whereof the axis of symmetry is oriented perpendicularly to the ground and in the direction of the latter.

Also, the detector is not collimated such that it can detect photons coming from the surface with a detection opening of 180° or 2π steradians.

Where necessary, this detector 11 is cooled by a cooling unit 14 which can be a tank of liquid nitrogen or a cryoelectric cooling system operating via Peltier effect.

The system 1 also comprises a computing and processing unit 12, and a memory 13 connected to said unit. The detector is provided with an interface 15 for transmitting data to the computing and processing unit.

The system 1 comprises a positioning device 16, for example a satellite geopositioning system (GPS), connected to the computing and processing unit, to associate with the spectrometric data acquired at a measuring point geographic the coordinates of said point.

Physical Principle

Figure 1B:
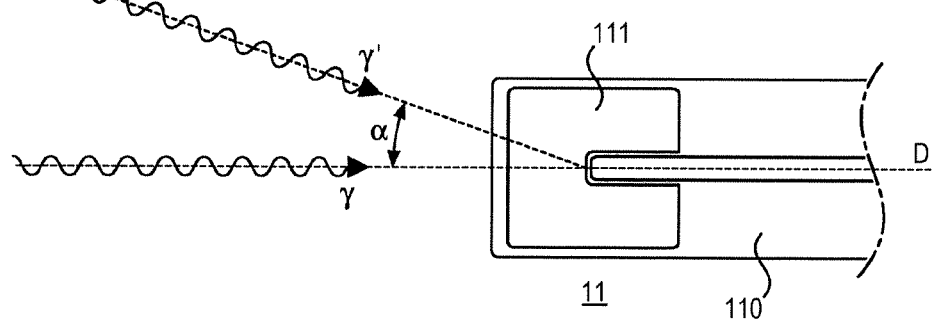

In FIG. 1b, this schematically illustrates a radiation detector 11. This detector comprises a matrix of detection cells 111 arranged in a vacuum chamber 110 by which the gamma rays transit before being detected.

As is evident in this figure, detection efficacy depends on intrinsic efficacy of the detector and the geometry of the detector.

More particularly, for a given detector, the efficacy of the detector is as follows:

$$\frac{N_f}{A} = \frac{N_f}{N_0} \cdot \frac{N_0}{\Phi} \cdot \frac{\Phi}{A}$$

$N_f$ corresponds to the rate of photon counting in the relevant energy band, in counts/s, and A is the activity of the source in Becquerel.

The term $$\frac{\Phi}{A}$$

corresponds to the angular distribution of the flow of photons, which depends solely on the distribution of radionuclides in the ground.

For gamma rays coming from a direction D parallel to the axis of symmetry of the matrix 110 of detection cells, a proportion $N_0/\phi$ of photons is detected relative to the flow axial incident, this proportion corresponding to the intrinsic efficacy of the detector.

However, if gamma rays γ' reach the detector by another direction, forming a non-zero angle α with the direction D, the efficacy detection changes (as a function of the value of the angle α and the geometric characteristics of the detector). In this respect, the term $N_f/N_0$ translates the variation of the term $N_0/\phi$ as a function of the angle of incidence of the flow of photons relative to an axial incident flow.

It is deduced from these observations that, for a number of photons gamma detected at a measuring point, a proportion only comes from the area located in the direction of measuring of the detector, and another proportion comes from areas adjacent to the measuring point.

Since the equation of the efficacy of the detector is a function of the angle made by the flow of radiation with the axis of symmetry of the detection matrix, it is possible to determine the number of events detected as a function of the angle of provenance of the photons.

In this respect, FIG. 2a schematically illustrates the number of events coming from a determined position relative to the detector (dark area) relative to all the events of the peak.

The number of events coming as a maximum from an angle θ around the detector is:

$$G(r) = \frac{N_f(0 \to \theta)}{N_f(0 \to \frac{\pi}{2})} = \frac{\frac{N_f}{N_0}(0 \to \theta) \cdot \frac{\Phi}{A}(0 \to \theta)}{\frac{N_f}{N_0}(0 \to \frac{\pi}{2}) \cdot \frac{\Phi}{A}(0 \to \frac{\pi}{2})}$$

With $$\theta = \tan^{-1}\left(\frac{r}{h}\right).$$

where r is the radius in meters on the ground around the detector and h the height of the detector relative to the ground.

Figure 2B:
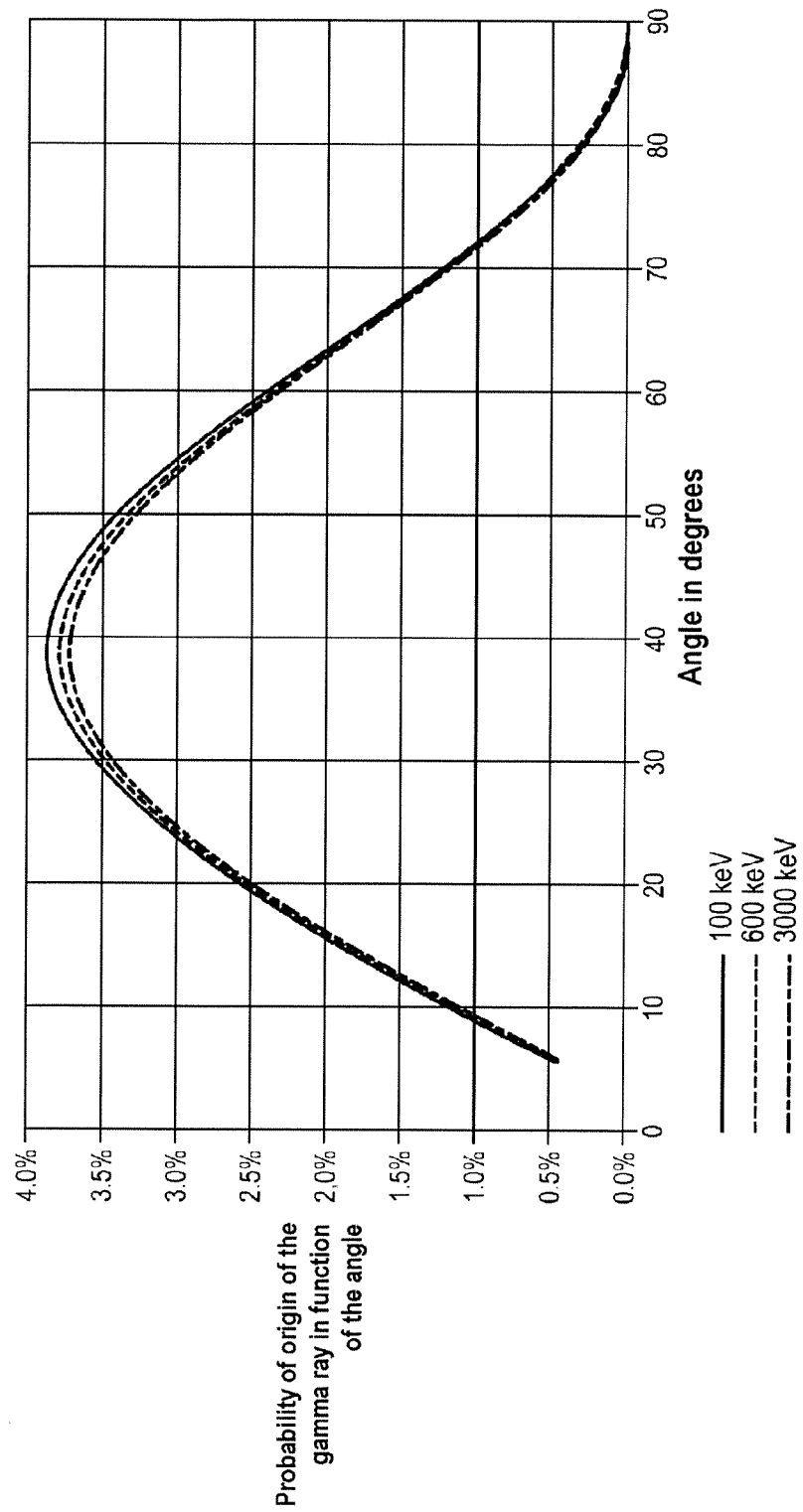
FIG. 2b illustrates the probability of provenance of a photon as a function of its angle of incidence relative to the detector.

A probability of provenance of a photon as a function of its angle of incidence can therefore be established, at a measuring point for which a certain quantity of photons is detected, from the efficacy function of the detector, as illustrated in FIG. 2b.

Three curves are illustrated in this figure, each corresponding to an energy of photon detection (respectively 100 keV, 600 keV and 3000 keV), these curves having been modelled for uniform distribution of radionuclides in the ground and with a detector situated 1 m above the ground.

Figure 3A:
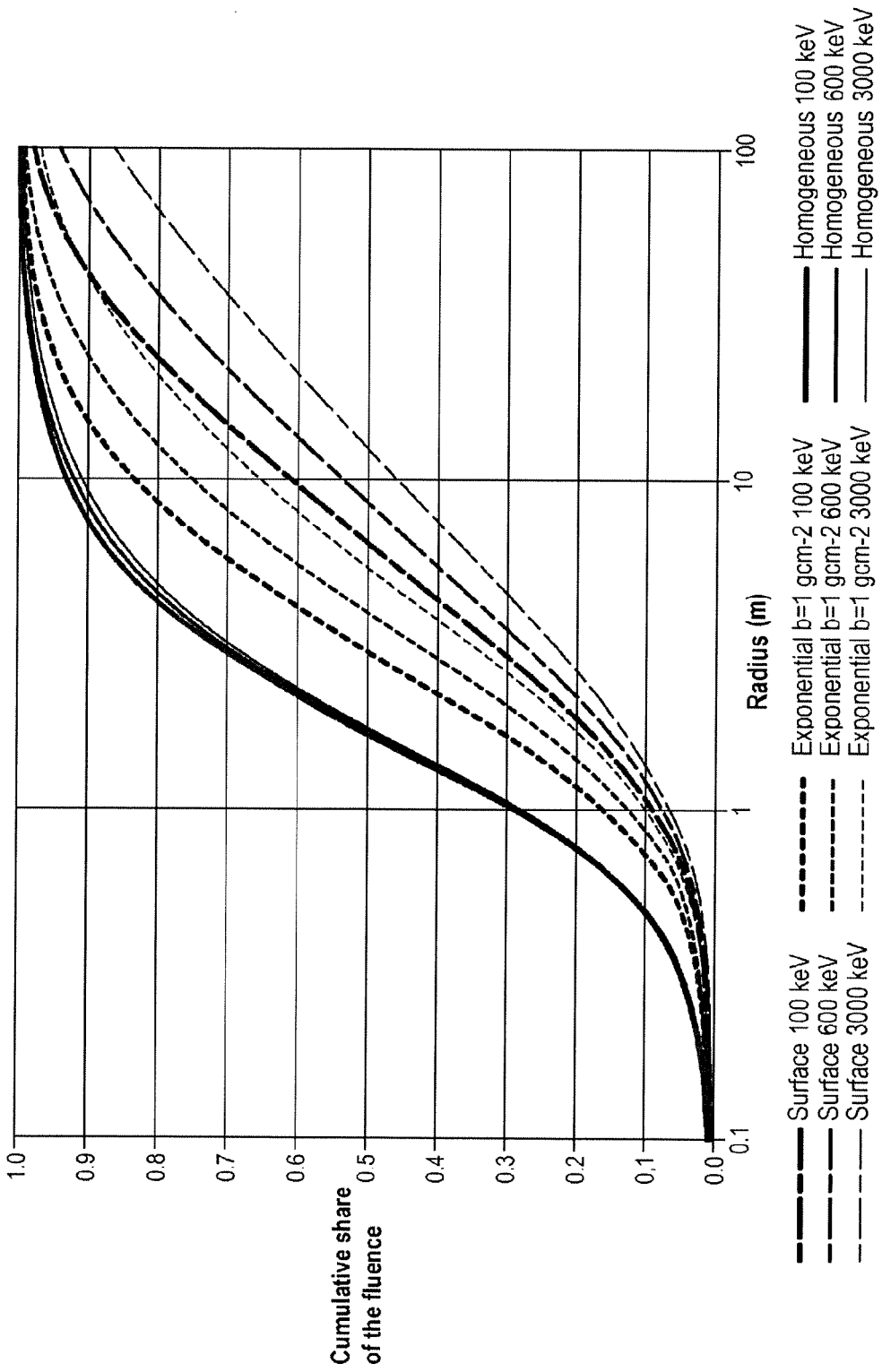
FIG. 3a illustrates the cumulative distribution of provenances of photons of a flow detected relative to the ground.

In reference to FIG. 3a, this shows the accumulated percentages of events (number of photons) relative to the total number of events detected, as a function of possible provenances of photons. The provenance of the photons is given by the distance r on the ground of the point of provenance of photons relative to the detector.

In the figure, several curves have been described, for different distributions of radionuclides in the ground, and for different energy values. Each time, the detector is one meter above the ground.

Figure 3B:
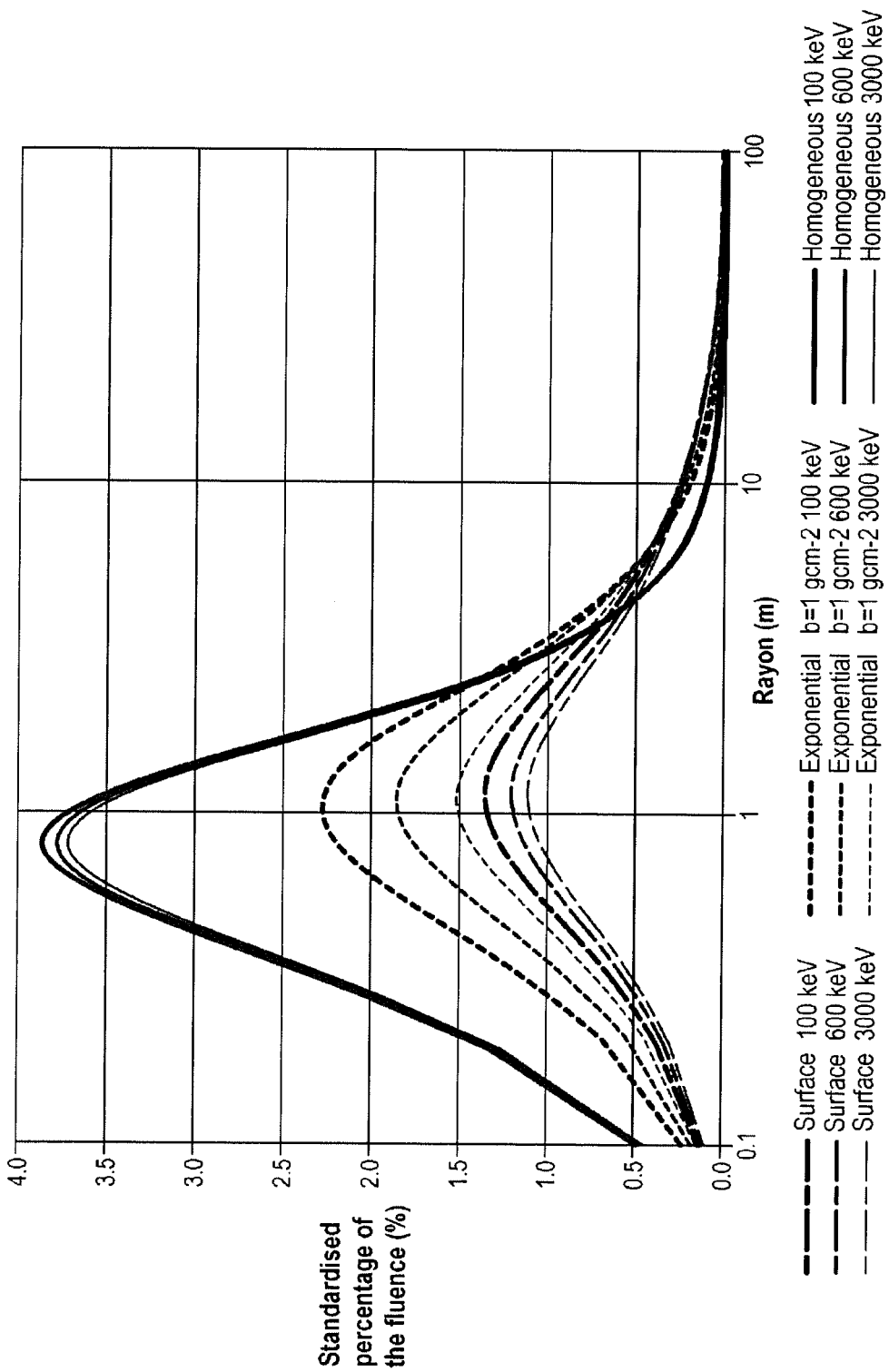
FIG. 3b illustrates the distribution of provenances of photons of a detected flow.

FIG. 3b illustrates the same non-cumulative percentages of events relative to the total number of events detected as FIG. 2b, as a function of the provenance of photons at a distance at the level of the ground relative to the detector.

This distribution is modelled by the percentage of photons relative to the total flow of photons coming from crowns of increasing size, centred on the detector, of external radius $R_e$ and internal radius $R_i$. The percentage of photons coming from a given crown is expressed by the equation:

$$F(Re) = G(Re) - G(Ri)$$

FIG. 3b shows that an event registered by the detector has a maximal probability of coming from a photon emission located one meter around the detector, if the distribution of the source in the ground is exponential (with a detector one meter above the ground and a relaxation mass coefficient equal to 1 g·cm$^{-2}$).

This crown modelling therefore provides, for a given counting rate of photons, the possible proportion of photons coming from a given distance between the point of the ground from which they come and the detector.

The principle described here is implemented in the method according to the invention, whereof the principal steps are indicated in FIG. 4.

During a first step 100, acquisition of spectrometric data takes place, at a measuring point. These data comprise an energy histogram attributing to each energy of a determined spectrum a corresponding number of gamma photons for the measurement time.

The energy of a gamma ray can indicate whether it has diffused or no, during this trajectory between the source and the detector, and it also indicates the nature of the atomic species at the origin of the emission of this ray.

For example, in the case of a radioactive source, the photon is characteristic of a line of emission of photons from a determined atomic species. A gamma photon having energy of 661.6 keV comes from the disintegration of an atom of Cesium 137.

Consequently, during this step 100, a portion of photons in a given energy band is selected from the total number of photons detected to analyse the presence only of a single species.

This step 100 also comprises the acquisition of data relative to positioning of the detection system 1, by way of the positioning device 13.

The detector 11 transmits the measured data to the computing unit 12 via the interface 15.

Next, during a step 200, the computing and processing unit 12 sets up distribution of possible provenances of photons as a function of the distance between the detector and a point of the ground from where they can originate, the distribution being of the type illustrated in FIG. 3b.

For this to happen, as a function of known parameters of the detector, hypotheses on the nature of the ground and on the distribution of the source of emission of photons in the ground, charts previously compiled for these parameters are used.

At this stage, the distribution of provenances of photons is therefore calculated in successive crowns centred on the detector, as described hereinabove.

Figure 5A:
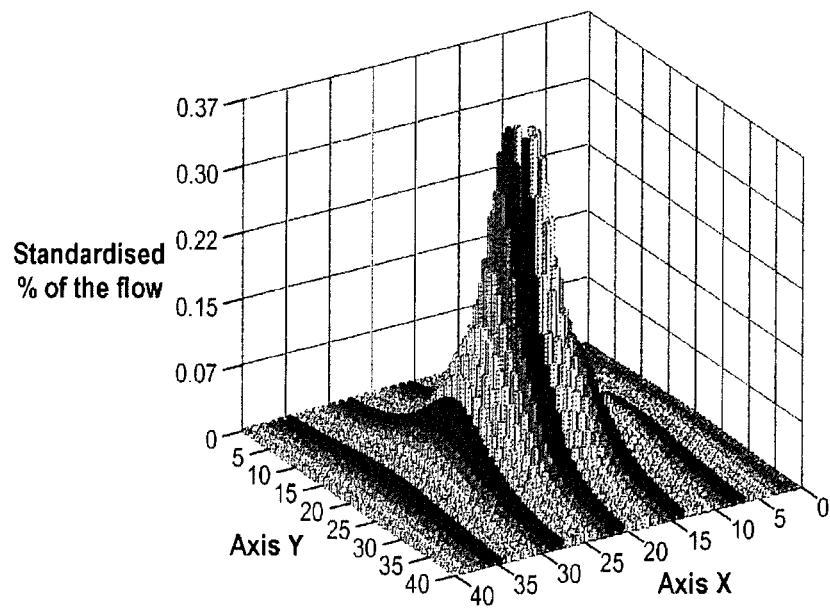
FIG. 5a illustrates three-dimensional modelling of distribution of provenances of photons around a detector.

The computing unit then generates, in reference to FIG. 5a, a three-dimensional cartography representing the percentage of photons of the detected flow coming from points located around the detector.

For this to happen, the computing unit generates a matrix whereof each element illustrates a pixel of the ground of determined size. For example, each pixel can represent a surface of 0.25 m$^2$.

Figure 5B:
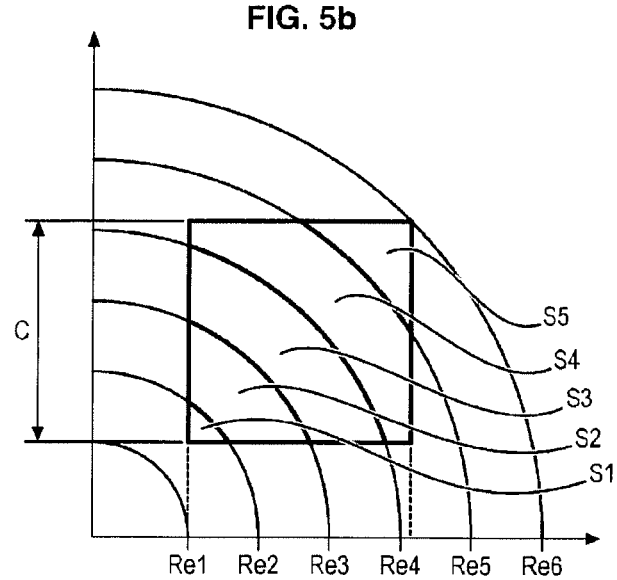
FIG. 5b illustrates a pixel of the modelling.
Figure 6A:
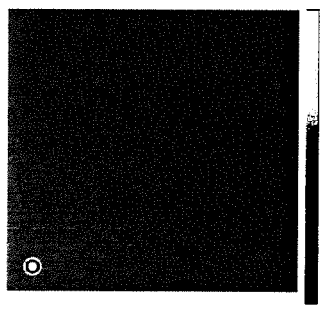
FIGS. 6a to 6h illustrate the progressive realisation of cartography by executing the method.
Figure 6B:
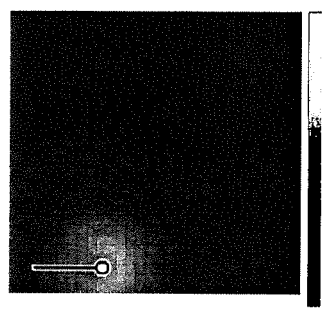
Figure 6C:
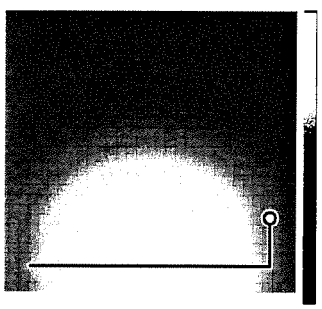
Figure 6D:
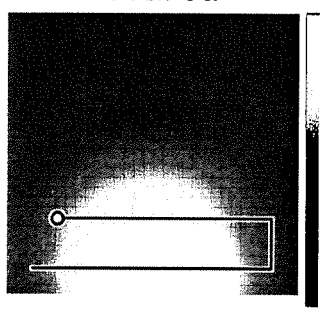
Figure 6E:
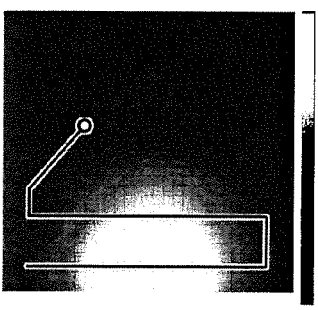
Figure 6F:
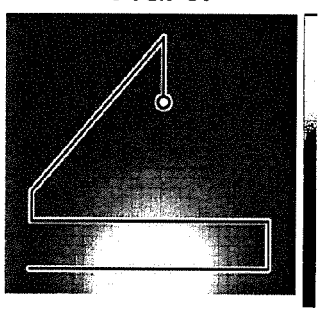
Figure 6G:
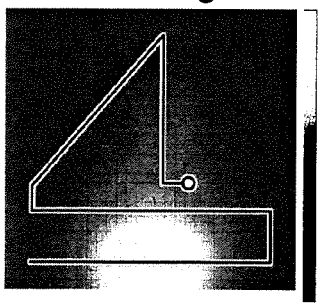
Figure 6H:
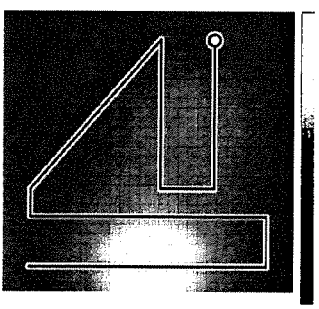

In reference to FIG. 5b, the percentage of the flow of photons coming from a pixel (i,j) is calculated from the preceding crown modelling. Each pixel has an intersection with several crowns, and the percentage of the flow of photons coming from the pixel is the average of the percentages of the flow coming from the intersections between these crowns and the pixel.

Weighting is carried out as a function of the intersection surface between a crown and the pixel:

$$H(i,j) = \frac{1}{C^2} \cdot \sum_{l=0}^{l_{max}(i,j)} S_l \cdot F(Re_l)$$

Where

H(i,j) is the value of the probability of provenance of a photon of the pixel (i,j), C is the size of one side of a pixel, $S_l$ is the intersection surface between the crown l of external radius $Re_l$ and the pixel (i,j), $l_{max}$ (i; j) is the number of crowns having an intersection with the pixel (i;j), and F(Re$_l$) is the standardised percentage of the flow of a crown of external radius Re$_l$ and of internal radius Re$_{l-1}$, all the crowns having a thickness e=Re$_l$−Re$_{l-1}$ equal (in meters), this percentage being deduced from the measurements of the detector.

The surface C$^2$ of a pixel is therefore equal to:

$$C^2 = \sum_{l=0}^{l_{max}(i,j)} S_l$$

And the number of crowns inscribed in the pixel (i,j) is calculated as follows:

$$l_{max}(i; j) = E\left[\frac{\sqrt{((i+1)\cdot C)^2 + ((j+1)\cdot C)^2}}{e}\right] - E\left[\frac{\sqrt{(i\cdot C)^2 + (j\cdot C)^2}}{e}\right]$$

Where E[x] designates the floor function.

The intersection surfaces between the crowns and the pixels are as such calculated with the digital integration method by trapezes.

The result is the matrix of FIG. 5a representing the distribution of possible provenances of photons (the relative estimation of percentages of the flow of photons at each point relative to the total flow detected) around the detector, pixel by pixel.

Referring again to FIG. 4, this matrix is then projected onto a map representing the site to be mapped, during a step 300 from the geographic position of the measuring point which has been acquired at the time of measurement. This representation indicates distribution of possible provenances of photons, around the measuring point at the level where the detector is located. Each pixel is associated with the probability of quantity of detected photons coming from this point.

This representation therefore indicates distribution of possible provenances of a source of the site, this source being the origin of the flows of photons detected and analysed.

During a step 400, the operator shifts the detection system to a measuring point adjacent to the first and reiterates the measurement steps 100, and steps 200 for calculation of distribution of provenance of photons around the detector.

In addition, prior to representation step 300 on the map, the computing unit 12 executes correlation, during a step 250, of the data obtained during the successive measurements.

This correlation is performed by averaging, in each pixel of the map, the values of the distributions of possible provenances of detected photons coming from this pixel, as a function of the number of preceding measurements which have affected this pixel.

This average can also be weighted by the values of distributions of provenances of photons on the pixels, since as is evident in FIG. 3a the greater this value at one point, the more precise the measurement of the value of the distribution of provenances of photons at this point.

Because of this, in representation step 300, not only the probability of provenance of photons detected for different points of the site is illustrated, given the counting rate measured in one or more previous measuring points, but even this probability is updated as a function of the rate of counting measured at the current measuring point.

The result in real time therefore is cartography of distribution of provenances of photons detected at the surface of the site, this cartography corresponding to distribution of the presence of a source in the site. This cartography is updated during displacements of an operator on the ground; it therefore provides the operator in real time with indications on the placement of a source at the origin of the photons detected, and seven guides him to this source.

In reference to FIGS. 6a to 6h, these illustrate the evolution of the result of execution of the method in a site, as a function of the displacement of an operator on the site. The clearer an area, the greater the value of the distribution of provenances of photons (the probability of provenance of photons) is in this area.

It is noted especially that cartography is done progressively and that it is corrected throughout displacement of the operator.

The invention claimed is:

1. A real-time cartography method of distribution of the presence of a source of photons in a ground, the method comprising steps of measuring, in a plurality of measuring points, a flow of photons in a determined energy band with a non-collimated spectrometric detector, and logging the geographic coordinates of said point, and in each measuring point,
 setting up a probability distribution of provenances of photon emitting source locations around a current measuring point, said setting up comprising the steps of:
 from an intrinsic efficacy of the spectrometric detector and a hypothesis on the distribution of radionuclides in the ground determining a distribution of the ratio of counting of photons emitted from each of the surrounding areas of the current measuring point over the total counting of photons detected at the current measuring point by the spectrometric detector,
 calculating the probability distribution of photon emitting source locations based on the ratio distribution with respect to the ground around the current measuring point,
 modelling the probability distribution on a surface, and
 representing the probability distribution of provenances of photons on a map of the ground, by projecting said surface onto the map of the ground,
 the method further comprising, for each measuring point from the second, a step performed prior to the representation step, during which the distributions of provenances of photons around the current measuring point are correlated with those of previous measuring points.

2. The method according to claim 1, wherein the determined energy band is centered on an energy line characteristic of an atomic species of the source of photons.

3. The method according to claim 1, wherein the modelling of a surface is done by generation of a matrix filled with a plurality of elements, and each element of the matrix represents a pixel of the site of a determined size.

4. The method according to claim 3, wherein, the modelling step comprises the association, with each pixel of a matrix associated with a measuring point, of a percentage of the flow of photons measured at the measuring point as a function of the distance between the pixel and the measuring point.

5. The method according to claim 4, wherein the percentage of the flow of photons associated with a pixel is determined from percentages of the flow of photons measured associated with rings centered on the measuring point and having an intersection with the pixel.

6. The method according to the claim 5, wherein the correlation step comprises calculation, for each pixel of the ground illustrated in a plurality of matrices modelled from several measuring points, of an average of the values of distributions of provenances of photons associated with said pixel as a function of the number of times when the pixel is repeatedly included within the plurality of matrices.

7. The method according to the claim 6, wherein the calculation of the average of the values of the distributions of provenances of photons comprises weighting said average of the values of distributions of provenances of photons is by said values of the distributions of the provenances of photons.

8. A system for detection of radioactive radiation to execute the method according to claim 1, the system comprising:

a mobile carriage (10), adapted to be shifted to a site,
a non-collimated radiation detector (11), mounted on said carriage, to measure spectrometric data in a plurality of measuring points,
a computing and processing unit (12),
a positioning device (16), and
a memory (13) in communication with the computing and processing unit, the system being characterized in that:
the radiation detector (11) is adapted to transmit spectrometric data to the computing and processing unit, and
said unit (12) is adapted to model, from the data and as a function of measured spectrometric data, distribution of provenances of photons around a measuring point, correlate the distributions of provenances of photons for several measuring points, and
represent distribution of photon emission on a map of the site.

\* \* \* \* \*